Jan. 30, 1945.	H. C. HAYES	2,368,217
ELECTRICAL PROSPECTING
Filed Aug. 2, 1940	10 Sheets-Sheet 1

INVENTOR
*Harvey C. Hayes*
BY
ATTORNEY

Jan. 30, 1945. H. C. HAYES 2,368,217
ELECTRICAL PROSPECTING
Filed Aug. 2, 1940 10 Sheets-Sheet 2

INVENTOR
*Harvey C. Hayes*
BY
*W. Glenn Jones*
ATTORNEY

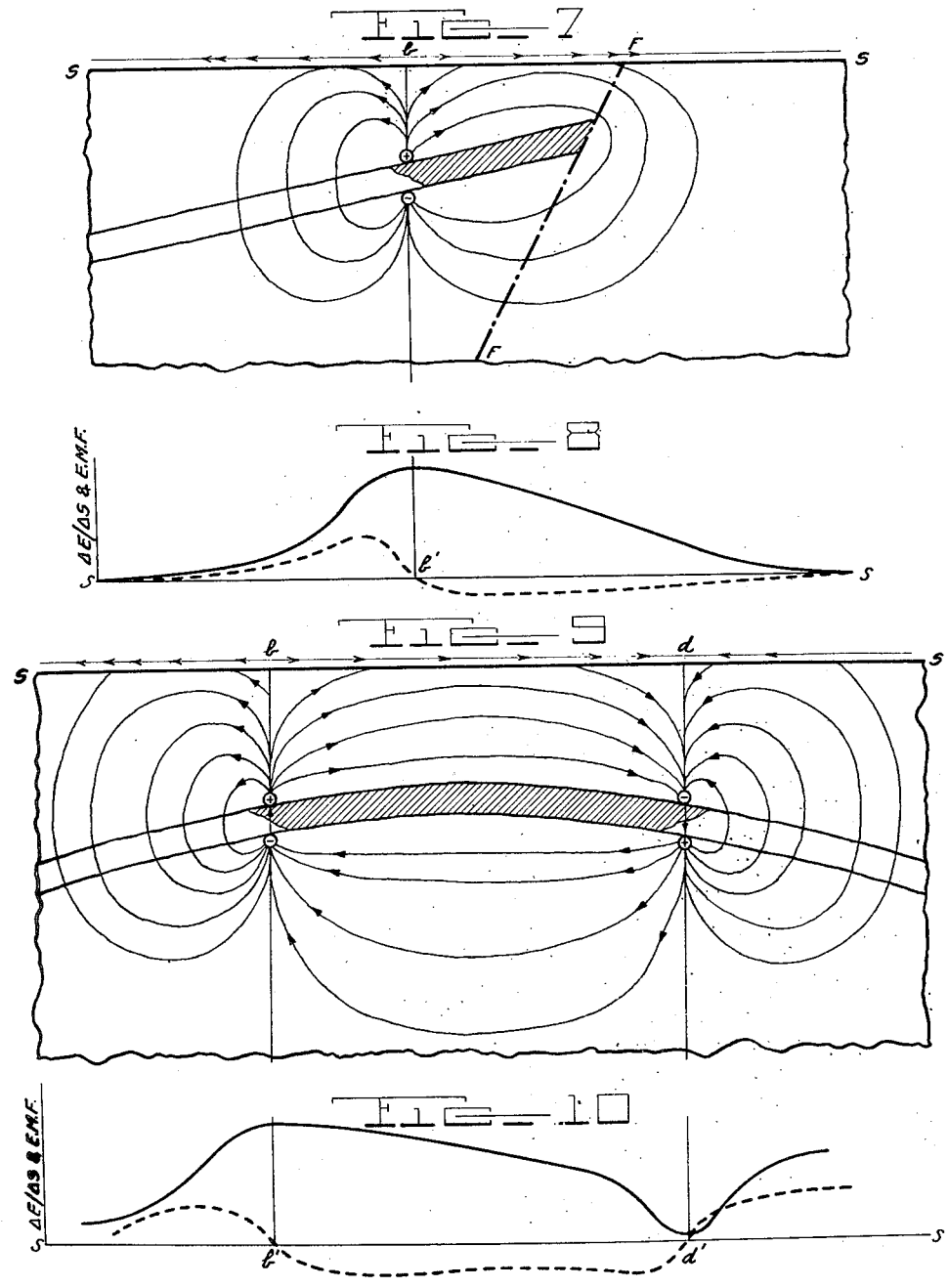

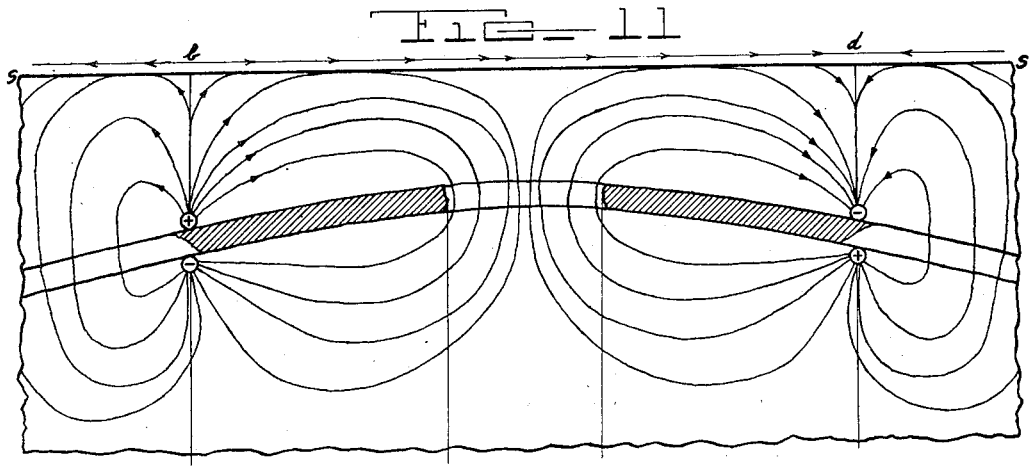
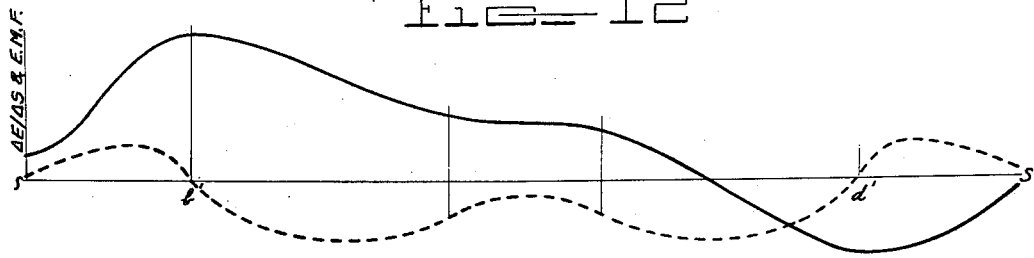
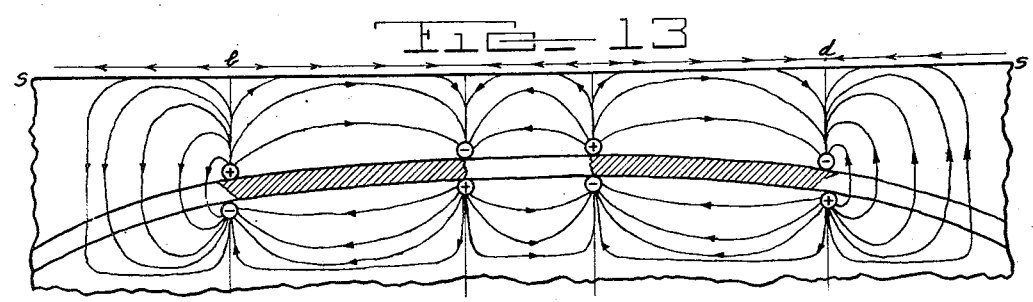
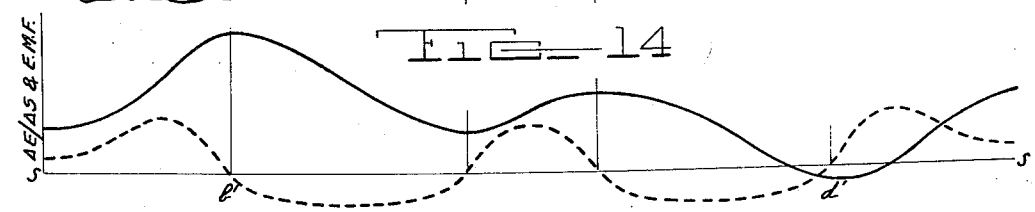

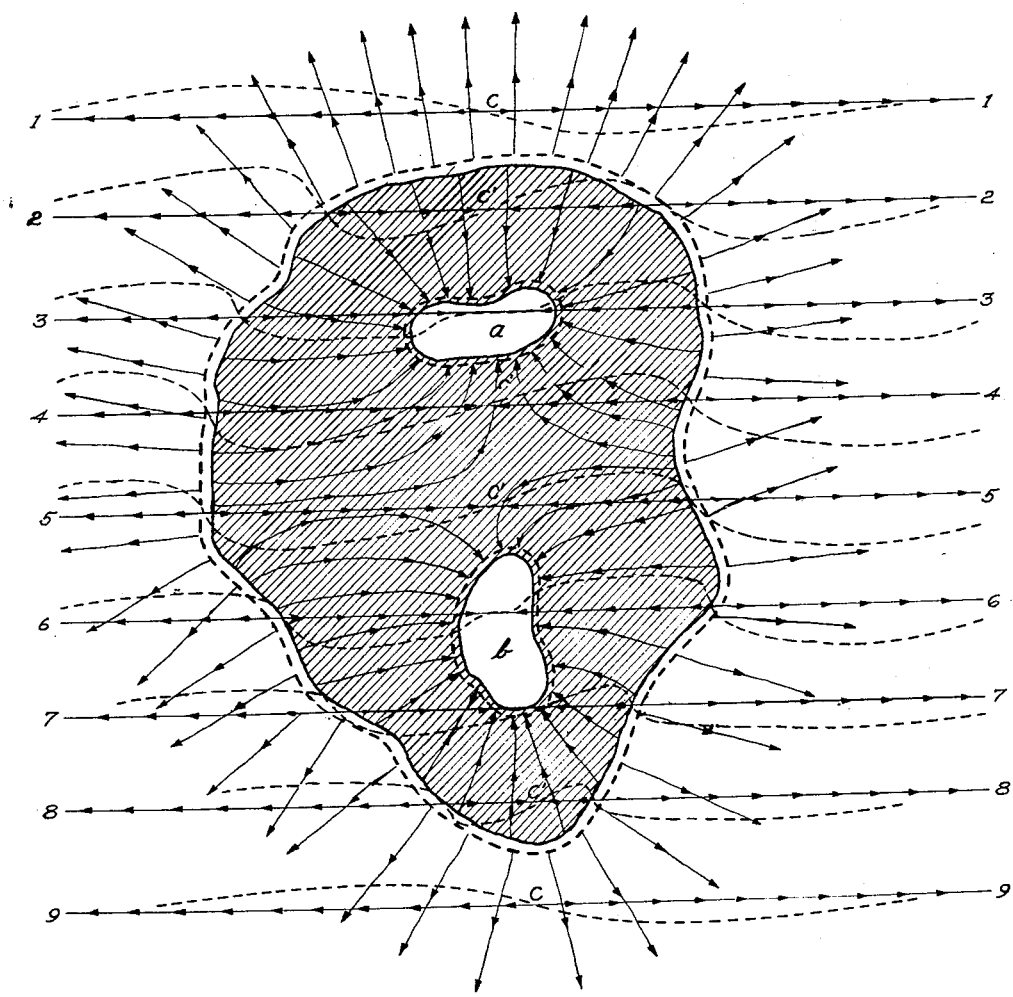

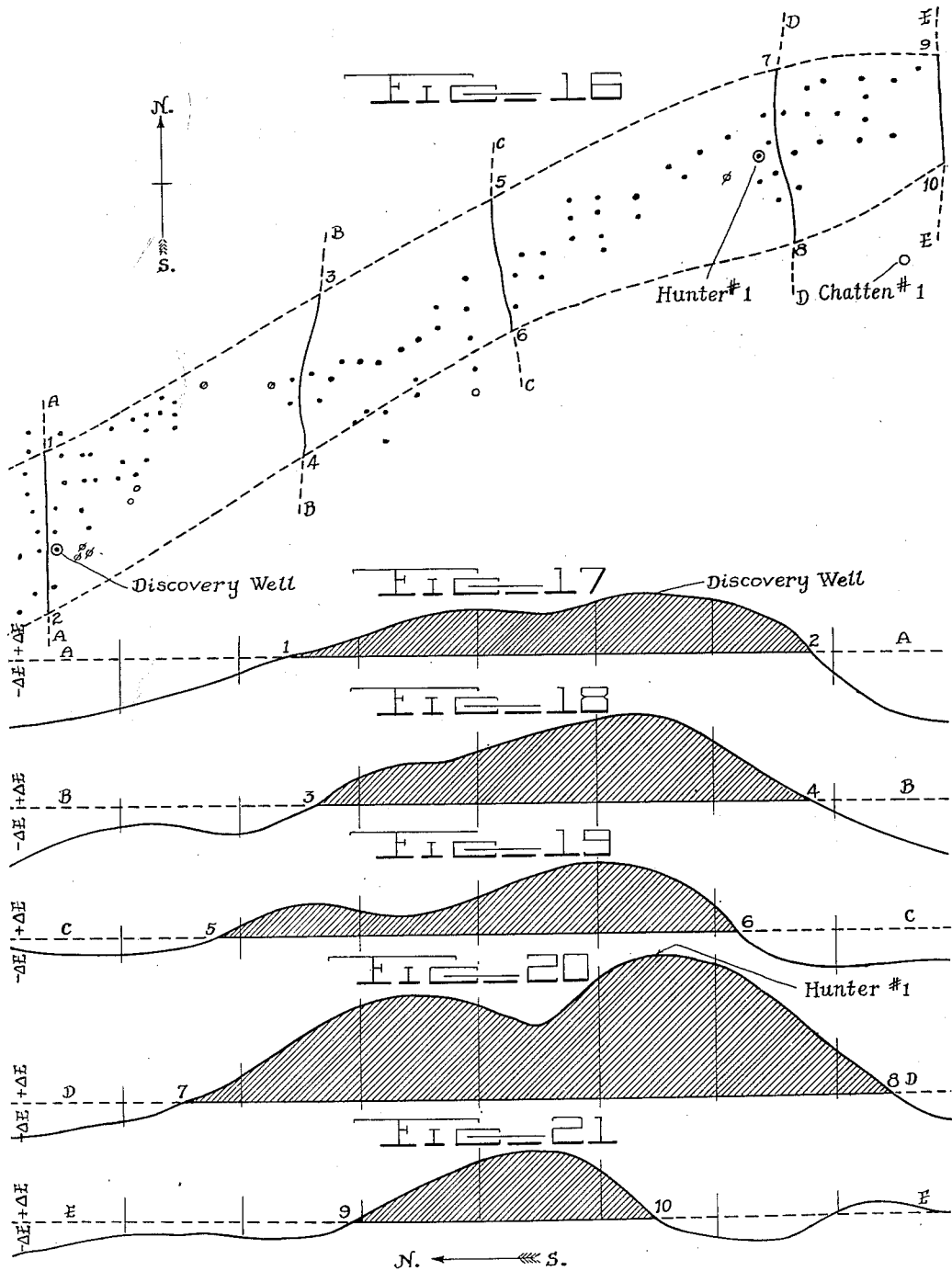

Jan. 30, 1945.   H. C. HAYES   2,368,217
ELECTRICAL PROSPECTING
Filed Aug. 2, 1940   10 Sheets-Sheet 7

INVENTOR
Harvey C. Hayes
BY
ATTORNEY

Jan. 30, 1945. H. C. HAYES 2,368,217
ELECTRICAL PROSPECTING
Filed Aug. 2, 1940 10 Sheets-Sheet 8
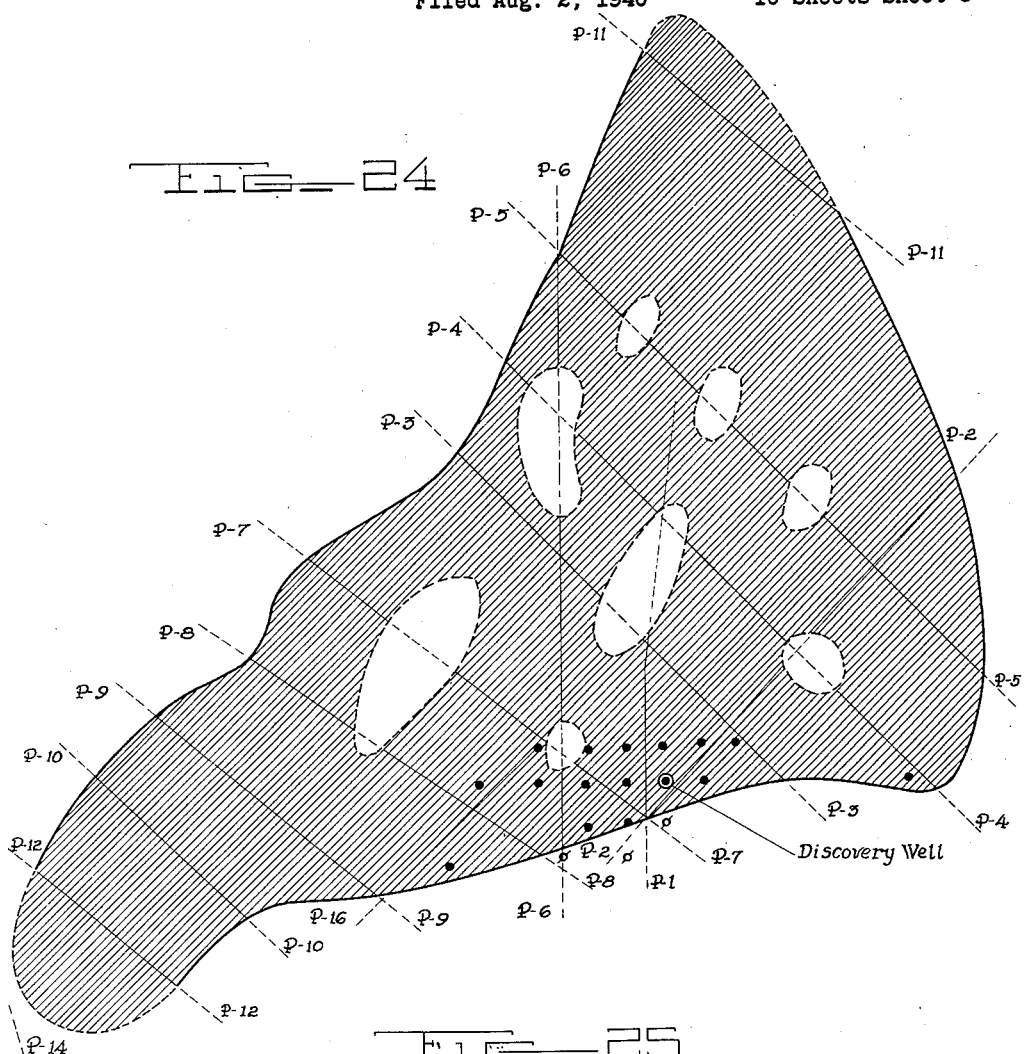
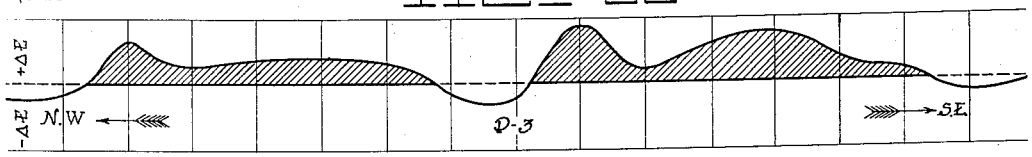
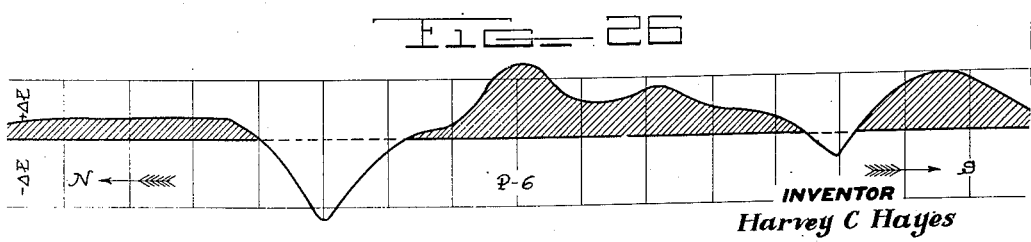
INVENTOR
*Harvey C Hayes*
BY
ATTORNEY Patented Jan. 30, 1945

2,368,217

UNITED STATES PATENT OFFICE 2,368,217

ELECTRICAL PROSPECTING

Harvey C. Hayes, Washington, D. C.

Application August 2, 1940, Serial No. 350,002

10 Claims. (Cl. 175—182)

(Granted under the act of March 3, 1883, as amended April 30, 1928; 370 O. G. 757)

My invention relates to a new and useful method of electrical prospecting and more particularly to a potential method of the stated character for determining the presence or the existence and/or the physical characteristics, such as the probable boundaries or extent, the depth and the inclination, of oil bearing formations in the earth's structure. By the term oil bearing formation as used in the specification and claims is meant only that portion of the geological formation that carries oil. It is to be distinctly understood that the method of the present invention is applicable to oil bearing formations whether or not they be known to exist in the area under investigation; and to the determination of the production limits thereof along one or more surface profile lines or more particularly along a sufficient number of such lines to form a closure over a chosen area.

The method of the present invention is based upon the discovery that oil bearing formations as found in a state of nature have vertically directed electrical current sheets associated therewith. These natural currents or current sheets, as distinguished from artificial currents or earth currents of remote origin now employed in electrical prospecting, have their origin substantially at the horizontal or side boundaries of oil saturated sands and flow along a portion or all of these boundaries. A proper interpretation of the characteristics of these vertically directed currents where they flow along the overlying surface serves to determine the production limits of the oil bearing formation, the inclination thereof or its approximate depth.

The characteristics of these surface earth currents, namely their intensity and direction, are determined and interpreted by means of a potential method. Broadly stated this method includes the steps of measuring at points along one or more surface profile lines on the earth differences of electrical potential that are caused at least in part by the natural currents associated with the oil bearing formation; and of plotting from the data so obtained one or more potential profile curves, equipotential curves or potential-differential-profile curves. The potential-profile curves, for example, may be plotted with the said differences of potential as ordinates and the said points as abscissae; the potential-differential-profile curve may be plotted with the said differences of potential as ordinates and the said points as abscissae; and equipotential curves may also be plotted, based on the said measurements. Each of these typical curves may be used to the exclusion of the others or in conjunction with one or more of the remaining curves for ascertaining the intensity and direction of the surface earth currents and hence the nature of the underlying oil bearing formation.

Let it be assumed that the plotted potential-profile curve, for example, is of a type that has a critical feature or features, such as a critical point or points, known to represent earth potentials resulting from current streams arising from the peripheries of a known type of oil-bearing formation, and known to indicate the presence or the physical characteristics, such as the boundaries, the depth and the inclination, of the known type of oil-bearing formation. The probable presence or physical characteristics of an oil-bearing formation beneath the measured surface profile line or lines may then be readily determined by mere analogy of the critical feature or features of the plotted potential-profile curve with the critical feature or features of the potential-profile curve of the said type. Similarly, if the plotted potential-differential-profile curve is of a type that has a critical feature or features known to represent earth potentials resulting from current streams arising from the peripheries of a known type of oil-bearing formation and known to indicate the presence or the physical characteristics of the known type of oil-bearing formation, the probable presence or physical characteristics of an oil-bearing formation beneath the measured surface-profile line or lines may be readily determined by similar analogy of the critical feature or features of the plotted potential-differential-profile curve with the critical feature or features of the potential-differential-profile curve of the said type. And similar analogy may be availed of if the plot of the equipotential curves is of the type that has a critical feature or features known to represent earth potentials resulting from the said current streams and known to indicate the presence or the physical characteristics of a known type of oil-bearing formation.

As hereinafter more fully explained, these curves are obtained by use of data showing potentials between certain points or electrode stations on the earth's surface over the area to be tested. The potential-profile curves and the potential-differential-profile curves are graphs, with distances along a traverse line as abscissae, and potential differences as ordinates. In the potential-profile curve, the potential plotted at each station along the traverse is the potential between two electrodes, of which the first is an electrode at that station, and the second is a remote electrode that remains connected to one terminal of the potential-measuring device, while the other terminal is connected successively to successive stations along the traverse.

While the abscissae of the potential-differential-profile curve are the same as those of the potential-profile curve, the ordinates differ. The ordinate plotted at each station for the potential-differential-profile curve is the potential difference between two electrodes relatively near that station, and spaced from the station and from each other by distances which are the same for all stations. This curve shows therefore what is essentially the rate of change of potential along the profile being traversed, and corresponds to the mathematical space derivative of the potential-profile curve.

Equipotential curves are potential contours on a map of the area under survey. A line drawn through all points or stations at any one potential, measured with respect to some remote electrode, is the equipotential curve for that specific potential.

The potential profile curves by a characteristic or critical departure from a substantially linear configuration and the equipotential curves by the formation of closed contours indicate the approximate production limits of the oil bearing structure and hence are of great value in detecting the presence of oil in the area under investigation.

The potential differential profile curve, on the other hand, serves often to indicate the limits of the oil bearing formation with greater precision through the utilization of certain critical points of this curve. Thus it may happen that the zero points are critical, these points being those of the potential differential profile curve where it intersects the axis of abscissae. In some cases, however, the maximum and the minimum points alone are critical for the purpose described.

For determining which group of points is critical in any given case the potential and/or potential differential profile curve plotted from experimentally derived data are compared respectively with characteristic potential or potential differential profile curves. These characteristic curves are based upon typical oil bearing formations known to exist in the earth's structure and upon my discovery that vertically directed electrical current sheets are associated with and originate substantially at the side boundaries of such formations. By comparing the experimentally derived potential or differential potential profile curves with the characteristic curves the critical points of the experimental curve may be determined and noted thereon to thereby define the production limits of the oil bearing formation with greater exactitude. It may also be observed that the equipotential curves and the potential and potential differential profile curves are useful for and are employed in determining the limits and the inclination of an oil bearing formation as well as the approximate depth thereof.

In actual practice, it is not necessary actually to correlate the plotted curve with a number of characteristic curves, in order to find a characteristic curve of form analogous to the plotted curve. The number of these characteristic curves is relatively small, and their shapes and critical features are easily carried in mind. All that the prospector does, therefore, is to study the plotted curve itself, and its characteristics and critical features. He does not find it necessary to compare it with characteristic curves of analogous form.

In actual practice, the prospector first plots his curves from the measurements. Even before the measurements have all been plotted, he recognizes from the presence or absence of the critical features thereof whether or not the curve is representative of a known oil formation. In the former case, he knows immediately, from the nature of the critical features of the curve, the type of the oil-bearing formation. In the latter case, he knows that he must therefore seek elsewhere for oil.

It is possible, of course, to practice the invention analytically, rather than graphically. There are mathematical relations corresponding to the plotted curves, and having corresponding critical points and features.

Though potential-profile, potential-differential profile, and equipotential curves have been employed in the past, they have not been employed for the present purpose, since they did not have the significance that they have according to the present invention.

In the case of oil bearing formations of the type in which the zero points of the potential differential profile curve are critical it may be advantageous to employ a special method of taking the data and of plotting the same. Thus where extraneous earth currents are present in the earth's structure which have their origin far removed from the area under test and from the natural currents associated with the formation, a vertical shift in the potential differential profile curve ensues with the an accompanying displacement of the critical zero points along the axis of abscissae. This displacement of the zero points is minimized through applying the conception of a normal potential profile or by making the space interval between successive potential measurements less than the distance over which the potential measurement is taken and by plotting the data so obtained in substantially the same manner. This special method of taking and plotting the data also serves to reduce the effect of any experimental error.

In the light of the foregoing it is among the several objects of my invention to provide a potential method for determining the existence and/or extent of an oil bearing formation which utilizes the natural electrical currents associated with the formation; to provide a method of the stated character wherein the production limits of an oil bearing formation are determined from one or more potential profile curves, equipotential curves or potential differential profile curves based upon potential measurements taken along one or more surface profile lines; to provide a method of the character noted in which each of these typical curves is used to the exclusion of or in conjunction with one or more of the others; to provide a novel method of taking and plotting data for compensating for experimental error and the effect of extraneous earth currents; and to provide a potential method for determining the inclination and/or approximate depth of an oil bearing formation which utilizes the natural electrical currents associated with the formation.

Other objects and many of the attendant advantages of this invention will be readily appreciated as the same becomes better understood by reference to the following detailed description when considered in connection with the accompanying sheets of drawings wherein.

Figure 4:
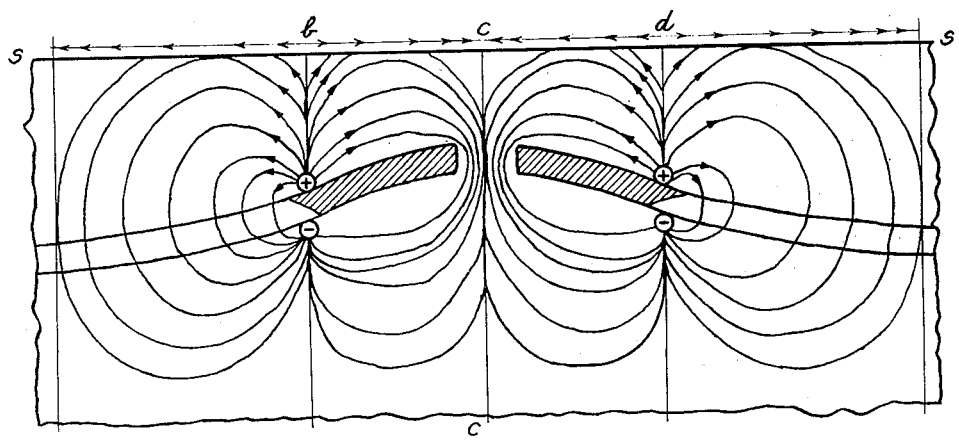
Fig. 4 is a vertical sectional view of the earth's structure taken along a surface profile line showing a characteristic oil bearing formation of the perforate type with its associated surface currents and vertically directed current sheets.
Figure 6:
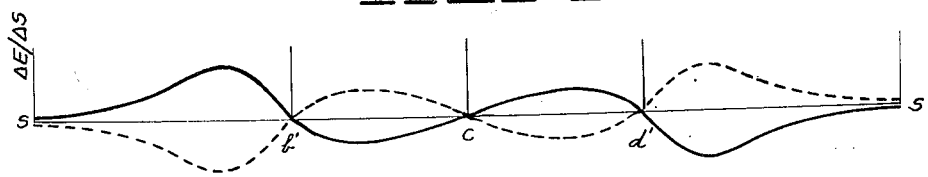
Figure 22:
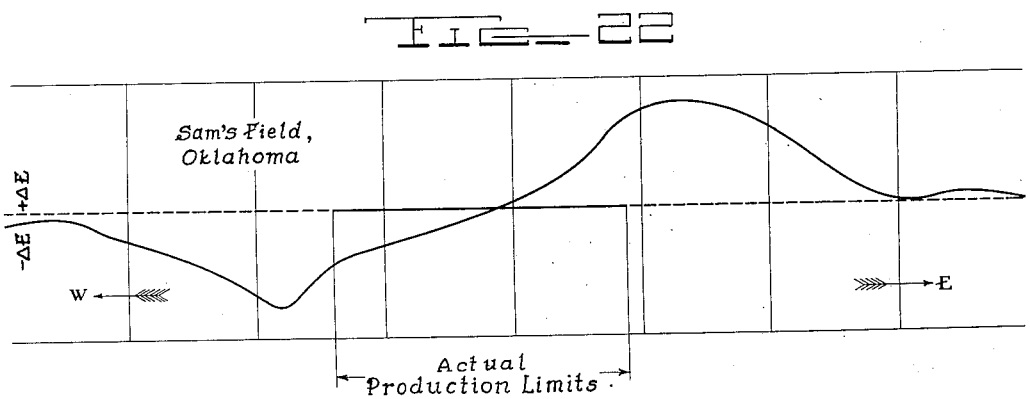
Figure 23:
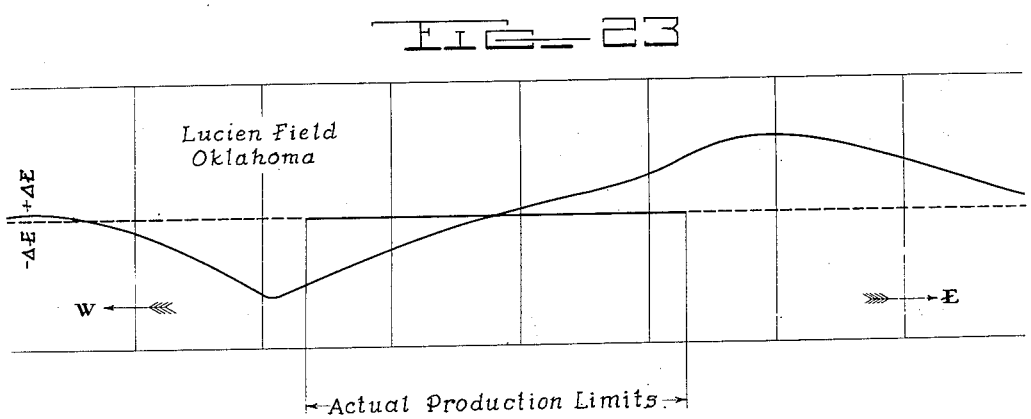
Figure 31:
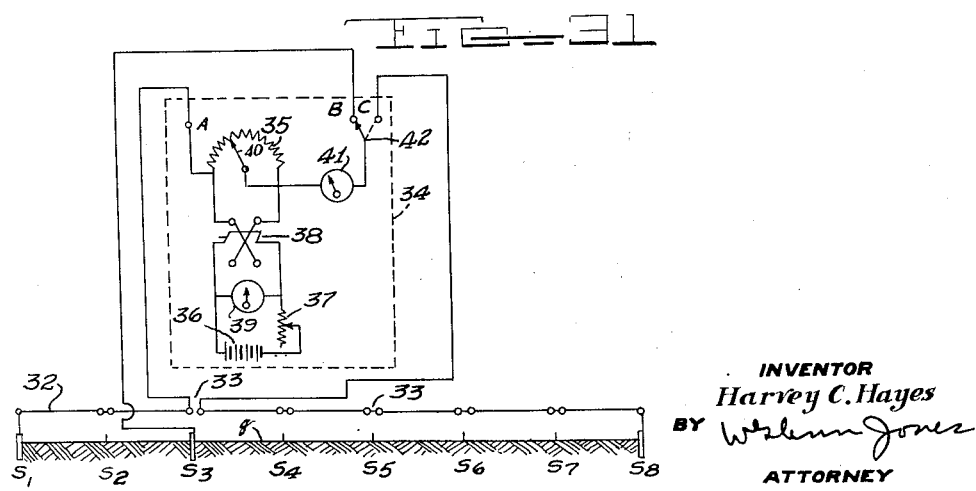
Figure 27:
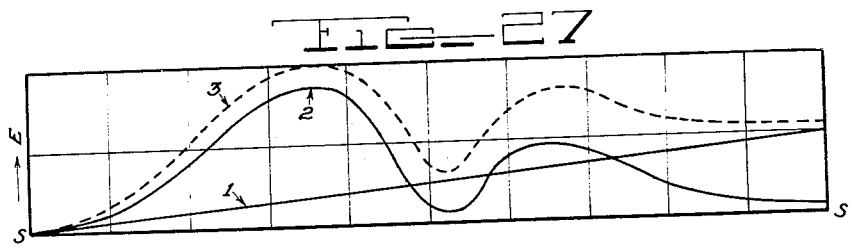
Figure 28:
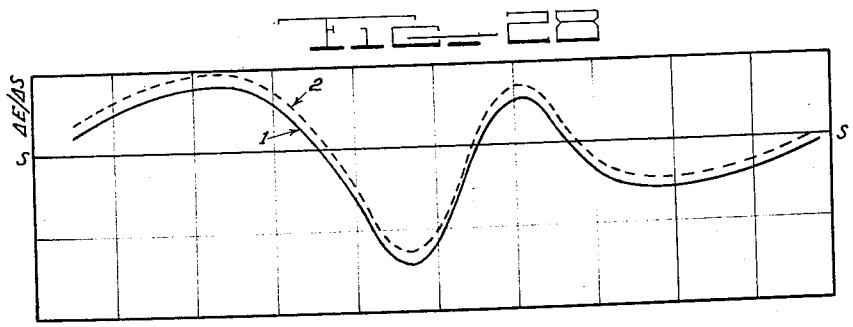
Figure 29:
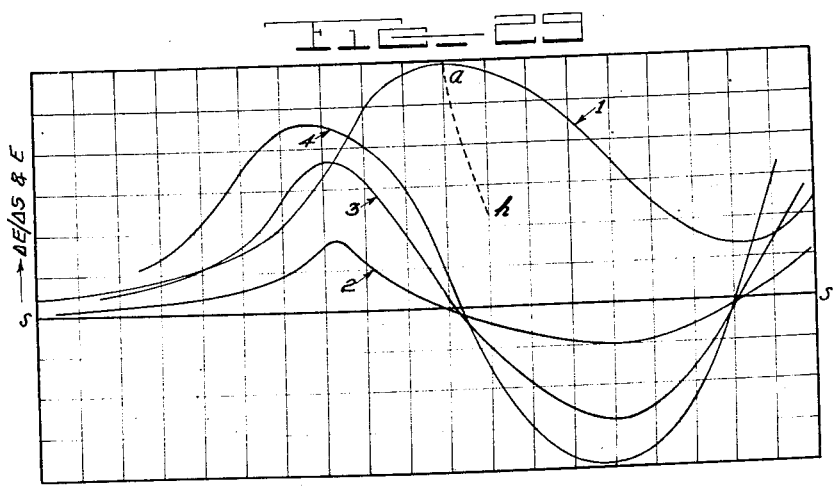
Figure 30:
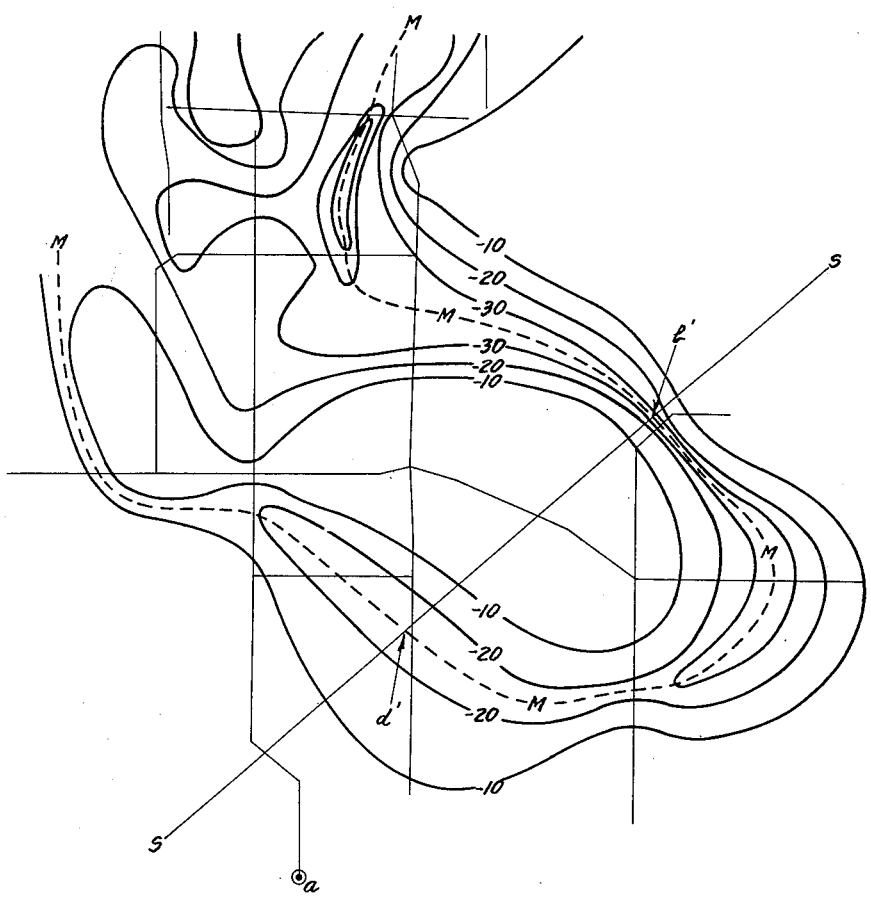

Fig. 6 discloses in solid line the characteristic potential differential profile curve based upon the distribution of the surface currents indicated in Fig. 4 and in dotted line the characteristic potential differential curve corresponding to a reversed electrical polarity of the electromotive force at the outer boundaries of the formation;

Fig. 7 is a vertical sectional view of the earth's structure taken along a surface profile line showing a characteristic oil bearing formation of the type that terminates at a fault line with its associated surface currents and vertically directed current sheets;

Fig. 8 shows in solid and dotted lines respectively the characteristic potential and potential differential profile curves based upon the distribution of the surface currents indicated in Fig. 7;

Fig. 9 is a vertical sectional view of the earth's structure taken along a surface profile line showing a characteristic oil bearing formation of the imperforate type with its associated surface currents and vertically but oppositely directed current sheets at opposing boundaries;

Fig. 10 shows in solid and dotted lines respectively the characteristic potential and potential differential profile curves based upon the distribution of the surface currents indicated in Fig. 9;

Fig. 11 is a vertical sectional view of the earth's structure taken along a surface profile line showing a characteristic oil bearing formation of the perforate type with its associated surface currents and vertically but oppositely directed current sheets at opposing outer boundaries;

Fig. 12 shows in solid and dotted lines respectively the characteristic potential and potential differential profile curves based upon the distribution of the surface currents indicated in Fig. 11;

Fig. 13 is a vertical sectional view of the earth's structure taken along a surface profile line showing a characteristic oil bearing formation of the perforate type with its associated surface currents and vertically but oppositely directed current sheets at opposing inner and outer boundaries;

Fig. 14 shows in solid and dotted lines respectively the characteristic potential and potential differential profile curves based upon the distribution of the surface currents indicated in Fig. 13;

Fig. 15 is a plan view of a portion of the earth's surface taken on the line S—S of Fig. 4 showing the general distribution of the surface currents associated with the underlying oil bearing formation, the component distribution of the surface currents along a plurality of surface profile lines and the characteristic potential differential profile curves based upon the component current distribution by means of which the production limits of the formation are defined;

Fig. 16 is a plan view of a portion of the earth's surface in the Rodessa Fault area of Louisiana showing the production limits of an underlying oil bearing formation in dotted line as actually determined by the method of the present invention;

Figs. 17 to 21 are experimentally derived potential differential profile curves based upon potential measurements taken in this fault area along the respective surface profile lines A—A, B—B, C—C, D—D and E—E of Fig. 16;

Figs. 22 and 23 are experimentally derived potential differential profile curves based upon potential measurements taken respectively along an east-west surface profile line in the Sam's Field and the Lucien Field of Oklahoma;

Fig. 24 is a plan view of a portion of the earth's surface in the Buckner Field area of Arkansas showing the production limits of an underlying oil bearing formation in solid line as actually determined by the method of the present invention;

Figs. 25 and 26 are experimentally derived potential differential profile curves based upon potential measurements taken in this field along the respective surface profile lines P—3 and P—6 of Fig. 24;

Figs. 27 and 28 depict the effect of extraneous earth currents respectively upon the potential and potential differential profile curves to show how much effect can be minimized;

Fig. 29 shows a single potential profile curve and three associated potential differential profile curves plotted with a progressively increasing distance of potential measurement to show how the displacement of the zero points along the axis of abscissae may be minimized when extraneous earth currents are associated with the formation under investigation;

Fig. 30 is a plan view of a portion of the earth's surface showing experimentally derived equipotential curves based upon data obtained from measurements taken along the disclosed surface profile lines; and Fig. 31 is a diagrammatic view of a suitable potentiometer arrangement and its application along a selected surface-profile line for obtaining the desired potential data.

As already noted hereinbefore the method of the present invention is based upon the discovery that oil bearing formations as found in a state of nature have vertically directed electrical current sheets associated therewith; and that these natural current sheets have their origin substantially at the horizontal or side boundaries of oil saturated sands.

The source of the electromotive forces required to maintain these current sheets, which extensive field tests have shown to definitely exist, is conceived as lying within or along the horizontal limits of the oil bearing formation as variously indicated in Figs. 1, 4, 7, 9, 11 and 13; and as resulting from chemical reactions within and between the complex hydrocarbon molecules and perhaps other elements within or contacting the oil bearing sands.

Relatively little is known about the nature of these balanced chemical reactions, but there is reason to believe that at least some of them result in generating electrical potentials, particularly those reactions that liberate energy; and there is some evidence that the liberation of methane and ethane gases results from such reactions.

The soil analysis work of V. A. Sokolov and G. Mogilevskii in Russia in 1934-35 shows a halo-like concentration of hydrocarbons at the surface which outlines the limits of underlying oil-bearing structures. Within the halo both methane and ethane gases are found in measurable quantities as well as a considerable amount of hydrocarbon deposits. Thus it appears that these lighter components of the reactions within the formation tend to penetrate its side boundaries and slowly seep upward to the surface. The release of these lighter components will cause the reactions within the formation to run toward the lighter phases and continuously replenish the supply. These reactions alone may well account for the electromotive forces which maintain the current sheets.

The magnitude of these bounding electromotive forces is dependent upon the nature and extent of the above noted reactions which are determined by the prevailing temperature and pressure conditions within the structure. These conditions, however, are not fixed. Temperatures and pressures are both changing throughout most of the earth's interior and as a result there must be a gradual reapportionment between the numerous chemical phases that are present within the oil formation. These reactions admittedly progress very slowly in most locations, but the products of such reaction may still be large because of the enormous masses that are involved. Thus, it is clear that the magnitude of the bounding electromotive forces and the capacity of their source are sufficiently large to maintain measurable current sheets which extensive field tests have shown to definitely exist.

Electromotive forces developed within the oil structure through readjustment between the numerous chemical phases due to gradual change of temperature and/or pressure will be vertically directed because both temperature and pressure gradients are so directed; but due to the high electrical resistivity of the oil-saturated sand and overlying shales, the resulting current flow will be through the less resistive formations that contact the oil-bearing formations. Because of its relatively low resistance, the vertical sheet of hydrocarbon deposits terminating in the halo may serve to confine the current sheet to within its approximate horizontal limits even for deep-seated deposits.

Vertically directed electromotive forces are also found wherever oil-saturated sands contact salt water-filled sands for the reason that the column of salt water terminated by salt impregnated shales forms a concentration cell that may generate an electromotive force of several millivolts. Such voltages are too small to account wholly for the experimental potentials and potential gradients obtained in field experiments but there is reason to believe that they play an important part in determining the character of the earth currents in some localities.

These bounding electromotive forces, the vertically directed electrical current sheets which they maintain and the surface currents caused by the flow of these current sheets along the overlying surface make it possible to develop characteristic potential and potential differential profile curves based upon typical oil bearing formations known to exist in the earth's structure. These characteristic curves are thereafter employed in interpreting experimentally derived curves based upon actual field test data.

Typical oil bearing formations with their associated surface currents and vertically directed current sheets together with their characteristic potential and potential differential profile curves based upon the distribution of the surface currents are disclosed in Figs. 1 to 15 of the drawings. In Figs. 1, 4, 7, 9, 11, 13 and 15 the oil deposit is indicated by the hatched area and the surface profile line, with the exception of Fig. 15, by the letters S—S. The arrows paralleling the lines S—S in Figs. 1, 4, 7, 9, 11, and 13 and coinciding with the horizontal lines of Fig. 15 indicate the direction and intensity of the surface currents along the surface profile lines. In Figs. 3, 6, 8, 10, 12 and 14, the points of the potential differential profile curve that are critical in fixing the limits of the oil bearing structure are designated $b'$ and $d'$. These critical points as may be noted from a cursory examination of the drawings fall into two groups. In one group the maximum and minimum points are critical while in the remaining group the zero points are critical in delimiting the oil bearing formation.

Figure 1:
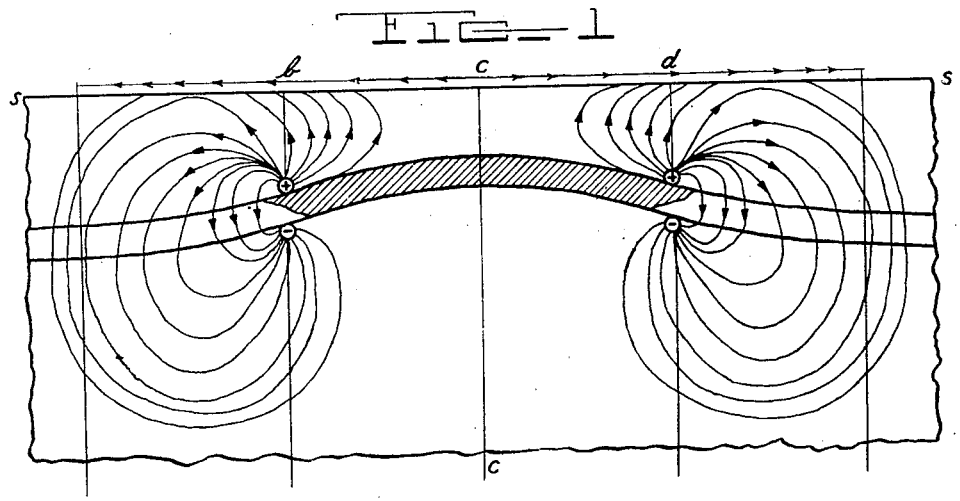
Fig. 1 is a vertical sectional view of the earth's structure taken along a surface profile line showing a characteristic oil bearing formation of the imperforate type with its associated surface currents and vertically directed current sheets.

Turning now to Fig. 1 of the drawings there is shown disclosed therein an oil bearing formation of the imperforate type with its associated surface currents and vertically directed current sheets. The lines of current flow beneath the surface are roughly indicated by the closed curves which have their origin substantially at the horizontal boundaries of the formation. Since the bounding electromotive forces are unidirectional in character they drive the current sheets at opposing boundaries vertically upward.

Figure 2:
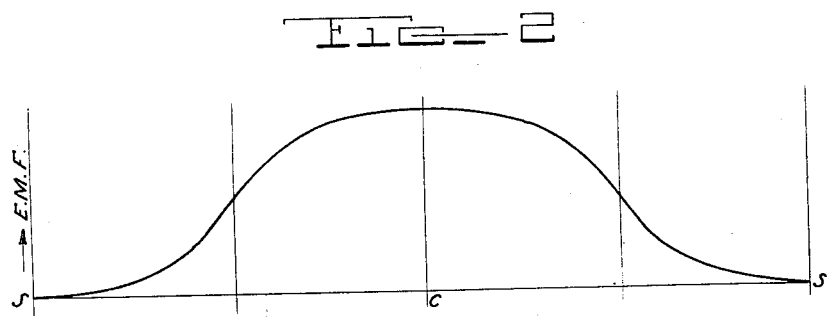
Fig. 2 shows the characteristic potential profile curve based upon the distribution of the surface currents indicated in Fig. 1.
Figure 3:
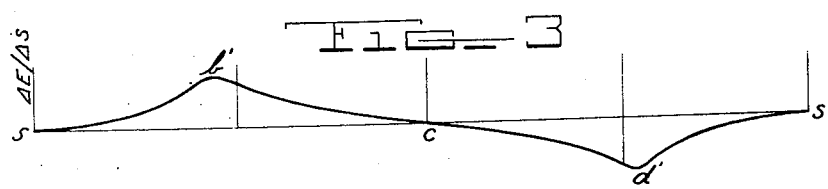
Fig. 3 depicts the characteristic potential differential profile curve likewise based upon the distribution of the surface currents indicated in Fig. 1.

Figs. 2 and 3 show respectively the characteristic potential and potential differential profile curves based upon the distribution of the surface currents indicated in Fig. 1. Since the oil bearing formation depicted in Fig. 1 is symmetrically arranged with respect to the center line $c$—$c$, the potential profile curve of Fig. 2 is likewise symmetrical and the potential differential profile curve of Fig. 3 has mirrored symmetry with respect to this line.

Where the oil bearing formation and the polarity of the bounding electromotive forces are as indicated in Fig. 1, the points $b'$ and $d'$, which are the maximum and minimum points respectively of the potential differential profile curve, are critical in defining the limits of the formation under investigation. While these points, as clearly indicated in Fig. 3, may not in some cases fall exactly on the perpendiculars passing through the side boundaries of the oil formation, they will under such circumstances lie very near these perpendicular lines.

Letting the ordinate E represent the electromotive force E. M. F., and the abscissa $s$ the distance corresponding to the ordinate E along the surface-profile line $s$—$s$, measured from any convenient origin, the equation of the characteristic potential-profile curve may be expressed as $$E = f(s)$$

where $f(s)$ represents a relation between the potentials E and the positions $s$ of the points at which these potentials are measured, as a function of $s$. The exact nature of this function it is not necessary here to specify. In the case of Fig. 2, corresponding to the horizontal oil-bearing formation illustrated in Fig. 1, this function, as already explained, is symmetrical with respect to the center line c—c.

The function $f(s)$ may be derived mathematically. In any particular case, however, the potential-profile curve may be obtained experimentally by plotting the observed values E of the electromotive force E. M. F. corresponding to the various points on the line s—s.

The characteristic potential-differential-profile curve of Fig. 3 may be obtained by differentiating the above equation of the characteristic potential-profile curve with respect to s:

$$\frac{dE}{ds} = f'(s)$$

where $f'(s)$ represents the derivative of $f(s)$ with respect to s. Interpreted in terms of physics, the ordinates of the potential-differential-profile curve at all points along the line s—s obviously represent the rate of change of the potential with respect to the distance s along the surface-profile line s—s. This expression, too, therefore, represents a relation dependent upon the potentials E as a function of s.

In any particular case, the potential-differential-profile curve may be obtained graphically by plotting the increments ΔE of the electromotive force for equal relatively small increments Δs corresponding to the various points on the surface-profile line s—s. The increments ΔE may preferably, but not necessarily, be plotted over the center point of each small increment Δs.

At the extreme left-hand point of Fig. 2, for example, the characteristic potential-profile curve, representing the electromotive force E. M. F. as a function of s, is shown to be tangent to the axis s—s of abscissae. The increment ΔE, at that point, therefore, is zero, as indicated by the corresponding extreme left-hand point of the characteristic potential-differential-profile curve of Fig. 3. To the right of the said extreme left-hand point of Fig. 2, the characteristic potential-profile curve rises: at first gradually, and then more rapidly, until a point of inflexion is reached. This represents an increase in the increments ΔE of the electromotive force E. M. F. with respect to equal increments Δs in s: at first gradual, and then more rapid, as represented by Fig. 3. To the right of the said point of inflexion, the characteristic potential-profile curve of Fig. 2, though continuing to rise, does so less rapidly. The increments in ΔE with respect to equal increments Δs, therefore, become less and less progressively to the right of the said point of inflexion. The point b' of the characteristic potential-differential-profile curve of Fig. 3, corresponding to the said point of inflexion of the characteristic potential profile curve of Fig. 2, accordingly represents a maximum. At the center line c—c, the characteristic potential-profile curve of Fig. 2 is parallel to the axis s—s of abscissae; at this point, therefore, the increment ΔE in the electromotive force E. M. F. is zero. The characteristic potential-differential profile curve of Fig. 3, therefore, crosses the axis s—s of abscissae at the center line c—c.

As the characteristic potential-profile curve of Fig. 2 is symmetrical with respect to the center line c—c, the increments ΔE with respect to equal increment Δs to the right of the center line c—c will have the same numerical value as the corresponding increments ΔE to the left of this center line. Corresponding to every value s to the right of the center line c—c, therefore, the characteristic potential-differential-profile curve of Fig. 3 will have an ordinate equal in value to the ordinate corresponding to the same value s to the left of this center line, but with opposite sign. The portion of the characteristic potential-differential-profile curve of Fig. 3 to the right of the center line c—c will consequently be the same as that to the left thereof, but below the axis s—s of abscissae, instead of above. The ordinate of the minimum point d' is naturally, therefore, of the same numerical value as that of the maximum point b', but negative.

In the case of oil-bearing formations that are not horizontally disposed, as hereinafter explained, these maximum and minimum ordinates b' and d' will not be of the same value, and this will furnish information for determining the inclination and the approximate depth of the formation. In cases where the potential-differential-profile curve is of the type in which zero points are critical, as hereinafter described, the values of the derivative corresponding to those zero points, of course, are zero. In cases where maximum and minimum values of the potential-differential-profile curve are involved, the corresponding values of the derivative are also a maximum and a minimum, as the case may be. The slope of the potential-differential-profile curve is measured by the second derivative.

Figure 5:
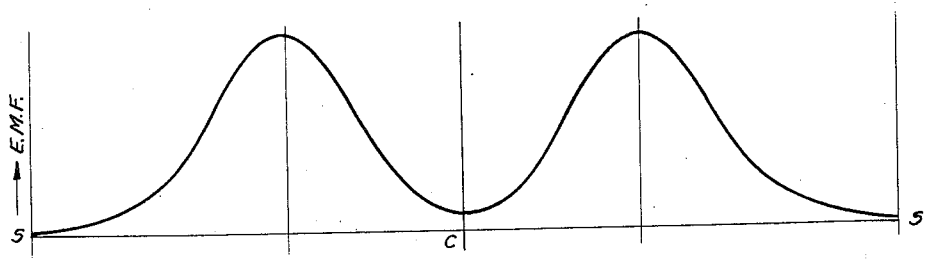
Fig. 5 shows the characteristic potential profile curve based upon the distribution of the surface currents indicated in Fig. 4.

Similar relations exist between the characteristic potential-profile curve of Fig. 5 and the full-line characteristic potential-differential-profile curve of Fig. 6; between the full-line characteristic potential-profile curve and the dotted-line characteristic potential-differential-profile curve of Fig. 8; and between other characteristic potential-profile curves and their corresponding characteristic potential-differential-profile curves.

The oil bearing formation depicted in Fig. 4 is of the perforate type wherein the perforation or conducting area is centered on its symmetrical axis c—c. As in Fig. 1 the surface currents and vertically directed current sheets are appropriately indicated. The bounding electromotive forces are unidirectional in character and of such a polarity as to drive the electrical current sheets vertically upward. The precise nature of the oil bearing formation is more clearly indicated in Fig. 15 of the drawings and as there shown includes two perforations or conducting areas identified by the reference characters a and b.

Figs. 5 and 6 in solid line show respectively the characteristic potential and potential differential profile curves based upon the surface current distribution of Fig. 4. The dotted line in Fig. 6 depicts the characteristic potential differential profile curve that would correspond to a reversed polarity of the bounding electromotive forces of Fig. 4. Since the oil bearing formation of Fig. 4 is symmetrically arranged with respect to the center line c—c the potential and potential differential profile curves of Figs. 5 and 6 respectively are likewise symmetrically arranged with respect to this line.

Where the oil bearing formation and the polarity of the bounding electromotive forces are of the character indicated in Fig. 4 the zero points b' and d' of the potential differential profile curve alone are crictial in defining the limits of the formation as clearly indicated in Fig. 6. In this connection it may be stated that only certain of the zero points are of importance in delimiting the formation, these points being those of the potential differential profile curve where the curve intersects the axis of abscissae at relatively large slopes. The reason for this will be explained more in detail hereinafter.

Fig. 7 depicts a characteristic oil bearing formation of the type that terminates or is cut off at a fault line F—F and wherein a source of electromotive force is associated with its opposing boundary. The electromotive force is of such a polarity as to drive the current sheet vertically upward. The vertically directed current sheets and the surface currents where these sheets flow along the surface overlying the formation are again appropriately designated in the drawings.

Fig. 8 shows in solid and dotted lines respectively the characteristic potential and potential differential profile curves based upon the distribution of the surface currents indicated in Fig. 7. From an examination of this figure it will be noted that the zero point $b'$ of the potential differential profile curve is critical in defining or limiting the boundary of the oil bearing formation that is opposed to that of the fault line.

Fig. 9 shows a characteristic oil bearing formation of the imperforate type similar to that of Fig. 1 in which the current sheets are vertically but oppositely directed at opposing boundaries. This is due to the fact that the electromotive forces have their polarities reversed at opposing boundaries. The surface current distribution disclosed in Fig. 9 caused by the presence of oppositely directed current sheets is quite different from that disclosed in Fig. 1. In consequence of the foregoing the potential and potential differential profile curves of Fig. 10 based upon the surface current distribution of Fig. 9 present radically different forms as compared with those of Figs. 2 and 3. As may be noted from an examination of Fig. 10 the zero points $b'$ and $d'$ of the potential differential profile curve are critical in defining the limits of the oil bearing formation.

Fig. 11 shows a characteristic oil bearing formation of the perforate type similar to that of Fig. 4 but in which the current sheets are vertically and oppositely directed at opposing outer boundaries. The vertically directed current sheets are caused to flow in the manner noted by reason of the presence of electromotive forces having reversed polarities at the outer boundaries. The distribution of the surface currents as indicated in Fig. 11 in consequence of these reversed polarities is quite different from that depicted in Fig. 4. The characteristic potential and potential differential profile curves based on the surface current distribution of Fig. 11 are shown respectively in solid and dotted lines in Fig. 12. Again the zero points $b'$ and $d'$ are critical in defining the outer limits of the oil bearing formation.

Fig. 13 also shows a characteristic oil bearing formation of the perforate type but in which, however, vertically directed current sheets originate at opposing inner and outer boundaries. Fig. 13 may be considered a modification of Fig. 11 to the extent that electromotive forces of reversed polarity are disposed along the inner boundaries of the formation. Thus, it follows that the surface current distribution of Fig. 13 is a radical departure from that depicted in Fig. 11. Fig. 14 shows in solid and dotted lines respectively the characteristic potential and potential differential profile curves based upon the distribution of the surface currents indicated in Fig. 13. In this case all of the zero points of the potential differential profile curve are critical in ascertaining the limits of the oil bearing formation. Two of these points are designated by the reference characters $b'$ and $d'$.

In practice, the surface current distributions and the experimental potential and potential differential profile curves based thereon may take forms vastly more complicated than the simple types considered above. Such experimental curves, however, can usually be analyzed into one or more of the characteristic fundamental forms depicted in Figs. 2, 3, 5, 6, 8, 10, 12 and 14 and interpreted accordingly.

The potential profile curves supply information that is less readily obtained from the potential differential profile curves in that they indicate clearly the part of the surface profile line that overlies the oil formation. The potential profile curves of Figs. 2, 5, 8, 10, 12 and 14, if carried far enough beyond the oil formation, would start and end at the same level because they would extend beyond the influence of the local currents associated with the formation and no extraneous earth currents are postulated as being present. A straight horizontal line joining the two ends of any of these potential profile curves would represent the potential profile curve if no oil formation with its associated current sheets were present. This horizontal line is termed the normal potential profile curve since it is the potential profile curve that would exist if the surface profile line crossed no local abnormalities. Therefore the oil formation, which constitutes the local abnormality, lies underneath that portion of the potential profile curve that departs characteristically or critically from its normal form. Thus the approximate limits of the oil bearing formation may be determined by noting the characteristic or critical departure of the potential profile curve from a linear configuration.

The potential differential profile curves, however, serve often to indicate the limits of the oil bearing formation with greater precision; and also supply certain information regarding the structure of the oil bearing formation and the currents associated therewith. Thus, where the oil bearing formation and the polarity of the bounding electromotive forces are as indicated in Fig. 1 the maximum and minimum points $b'$ and $d'$ respectively of the potential differential profile curve (Fig. 3) are critical in delimiting the formation. Where, on the other hand, the oil bearing formation and the polarity of the bounding electromotive forces are of the character depicted in Figs. 4, 7, 9, 11 and 13 the zero points $b'$ and $d'$ of the potential differential profile curves (Figs. 6, 8, 10, 12 and 14) are alone critical in defining the limits of the formation.

In the case where the zero points alone are critical in delimiting the formation a rising or descending current sheet causes the differential profile curves to cross the axis of abscissae at a relatively steep negative or positive slope respectively. It is important to note that only the zero points of the potential differential profile curve where it intersects the axis of abscissae at relatively large slopes are of interest in fixing the limits of the formation. The detailed reasons for this will appear hereinafter from a consideration of Fig. 15. Conducting areas within the confines of an oil bearing formation (Fig. 4) cause the potential differential profile curve (Fig. 6) to cross the axis of abscissae if the current sheets have the same vertical direction at the boundaries of the formation; but will only cause a depression in the potential differential profile curve (Fig. 12) that does not reach the axis of abscissae if the current sheets are oppositely directed and occur only at the outer boundaries as indicated in Fig. 11. A surface area of relatively high resistivity also produces a dip in the potential differential profile curve but does not carry it across the axis of abscissae. These comparatively few facts derived from a consideration of the foregoing characteristic curves are sufficient to account for the form of the experimentally derived potential differential profile curves.

Where the zero points of the potential differential profile curve are critical in delimiting the oil bearing formation, only those points are of importance for the purpose described where the curve intersects the axis of abscissae at relatively large slopes. This is because the slope of the potential-profile curve, at zero intercepts that do not define the boundary of an oil-bearing formation, such as is indicated by c, Figs. 6 and 15, normally is considerably less than is the slope at zero intercepts that do define the boundary. This will become evident from a consideration of Fig. 15 which, as already noted, is a plan view of a portion of the earth's surface taken on the line S—S of Fig. 4 showing the general distribution of the surface currents associated with the underlying oil bearing formation, the component distribution of the surface currents along a plurality of surface profile lines and the characteristic potential differential profile curves based upon the component current distribution by means of which the production limits of the formation are defined. These potential differential profile curves, for convenience, are plotted with the surface profile lines 1 to 9 as axes of abscissae.

The dotted line surounding the production area in Fig. 15 represents the axis of the current sheet at the surface overlying the oil bearing formation. The location of this dotted line which approximates the boundary of the production area is determined by noting certain of the zero points on the potential differential profile curves and by interconnecting corresponding noted points on adjacent curves to form a closure. Since all of the zero points, however, do not fall on this dotted border line some test must be devised for determining which of the critical points are important for the purpose described. A further consideration of Fig. 15 will make it evident why only those zero points are of importance where the potential differential profile curve intersects the axis of abscissae at relatively large slopes.

It will be noted from an examination of Figs. 4, 6 and 15 that the potential differential profile curves cut across the axes of abscissae wherever the component of the surface current along the surface profile line changes in direction; and that the slope of the profile curves at these points depends on the rate at which the component surface current varies along the adjacent portions of the surface profile line. The reversal of the component surface current at point c on surface profile lines 1 and 9 occurs where the direction of the slowly diverging surface currents becomes perpendicular to the profile lines. The rate of change of the surface currents adjacent the point c is relatively slow for the reason that the component of this current along the surface profile lines 1 and 9 is weak at best; and for the further reason that the direction of the surface current with respect to the surface profile lines changes slowly. The same observations may be made with respect to the points c' within the oil area.

The slope of the potential differential profile curves at all such points c and c' is usually small in comparison with the slope of these curves where they cross the axis of the current sheet at the dotted boundary line which, as already noted, defines the limits of the production area. The rate of change of the component surface current along the portions of the surface profile lines adjacent to the axis of the current sheet is in general greater than along any other part of the surface profile line; and along these portions it is greatest when the surface profile line is directed perpendicularly to the border line of the oil deposit. Thus, the degree of slope of the potential differential profile curve at the points where it crosses the axis of abscissae determines which of these points lie on the axis of a vertical current sheet and, as a result, it determines which points delimit the underlying oil bearing formation. Therefore, in determining the production limits of an oil bearing formation of the type in which the zero points of the potential differential profile curve are critical, it is only necessary to select and note those zero points where the curve intersects the axis of abscissae at relatively large slopes.

The potential differential profile curves may also be utilized in determining either the inclination or the approximate depth of an oil bearing formation relative to one or more surface profile lines. The inclination is determined by comparing either the relative magnitudes of the ordinates at the maximum and minimum points if these are critical or by comparing the relative magnitudes of the slopes of the potential differential profile curve where it intersects the axis of abscissae at relatively large slopes in the case where the zero points are critical. The approximate depth of the oil bearing formation is ascertained by determining the magnitude of $$\frac{\Delta E}{\Delta S}$$

at the critical points noted and substituting this value in the formula, $$\frac{\Delta E}{\Delta S} = \frac{K}{h^3}$$

where (K) is a constant derived from known fields and (h) is the depth of the formation.

The foregoing will become evident from a consideration of the oil bearing structures depicted in Figs. 1, 4, 9, 11 and 13. If these structures are rotated, by way of illustration, a few degrees with respect to the surface line S—S in a counter-clockwise direction, then the surface currents along the surface profile lines S—S will be more concentrated over the right hand margin of the formation than over the left hand margin thereof because of the resulting change in the cross section of the current stream at the borders. This will have the effect, as regards the oil bearing formation of Fig. 1, of increasing the height and slope of the right hand portion of the potential profile curve in Fig. 2 while decreasing the height and slope of the left hand portion thereof at the points corresponding to the limits of the formation. As a result of these changes in slopes of the potential profile curve at the points noted, the ordinate corresponding to the minimum point d' of the potential differential profile curve (Fig. 3) will exceed in magnitude the ordinate corresponding to the maximum point $b'$ of this curve. Thus, if the oil bearing formation is of the type in which the maximum and minimum points are critical in defining the limits, it is only necessary to compare the relative magnitudes of the ordinates at these points in order to ascertain whether or not the oil bearing formation is inclined with respect to the surface profile line. The direction of the declination of the oil bearing formation with respect to the surface profile line is from the ordinate of greater magnitude to that of lesser magnitude.

In the case of an oil bearing formation of the type in which the zero points of the potential differential profile curve are critical in defining the production limits such as depicted in Figs. 4, 9, 11 and 13, the increased concentration of the surface currents at the right hand margin of the formation as compared with the concentration at the left hand margin thereof, caused by a slight counterclockwise rotation of these formations with respect to S—S as previously described, makes the slope of the potential differential profile curve at the zero intercept limiting the right hand margin of the formation steeper than the slope at the corresponding zero intercept that limits the left hand margin of the formation. It follows, therefore, that the the direction of inclination of an oil bearing formation with respect to a surface profile line can be determined by comparing the relative magnitudes of the slopes of the potential differential profile curve at the bounding intercepts. The oil bearing formation will decline in the direction relative to the surface profile line from the point where the potential differential profile curve intersects the axis of abscissae at a relatively large slope to the point where the potential differential profile curve again intersects the axis of abscissae at a smaller slope. In other words, the oil bearing stratum will dip with respect to the surface profile line from the steeper to the less steep intercept. It may also be noted that the direction of dip of an oil bearing formation along the direction of a profile line can be determined from a comparison of the relative form and amplitude of the potential profile adjacent to the borders of the formation as indicated in the above paragraph.

From a consideration of Figs. 1, 4, 9, 11 and 13 it should be clear that the magnitude of the surface currents along the surface profile lines is also a function of the depth of the oil bearing formation because the cross section of the current stream between the surface S—S and the formation is proportional to the depth of the formation. From this observation it is at once evident that the magnitude of the ordinate at the maximum and minimum points of the potential differential profile curve (Fig. 3) corresponding to a formation of the type indicated in Fig. 1 will, among other things, depend upon the depth of the formation. Therefore, by noting the magnitude of the ordinate corresponding to at least one of the critical points of the potential differential profile curve in the case of a formation of the character depicted in Fig. 1 it is possible to approximate the depth of the underlying formation. Where the formation, however, is of the type in which the zero points of the potential differential profile curve are critical in delimiting the oil bearing formation, such as indicated in Figs. 4, 9, 11 and 13, it is only necessary to note the zero points on the curve where the curve intersects the axis of asbscissae at relatively large slopes and to ascertain the magnitude of at least one slope at one of the noted points in order to determine the approximate depth of the underlying oil bearing formation. This is possible since the magnitude of the slope at the noted points is a function of the depth of the formation of the stated character, $$\frac{\Delta E}{\Delta S} = \frac{K}{h^3}$$

The field procedure whereby data is obtained for the curves that are to be plotted employs two non-polarizing electrodes between which a potentiometer and a sensitive galvanometer are connected in series by means of well insulated cables. The potential difference between the two electrodes is measured in terms of the opposing electromotive force required to bring the galvanometer reading to zero in accordance with standard practice.

In Fig. 31, there is shown a surface-profile line $g$ extending across the area to be surveyed for locating the boundaries of an oil-bearing formation beneath the surface. It is assumed that the line $g$ has been chosen sufficiently long so as to extend for a substantial distance beyond both boundaries of the oil-bearing formation. It will be explained hereinafter, in connection with Fig. 27, how to take into consideration potentials due to extraneous earth currents during the plotting of the potential profiles. For the present, a method of taking measurements only will be discussed.

A well-insulated cable 32 is shown laid out along the surface-profile line $g$. It may be divided into a plurality of detachable sections, preferably of equal length. The points of connection 33 between adjacent terminals of the several cable sections may thus conveniently establish equally spaced stations $S_1$ to $S_8$, inclusive, at which to make the potential measurements. The station $S_1$ is shown positioned at one end terminal of the cable 32, and the station $S_8$ at the opposite end terminal. An electrode is driven into the earth at each station; and the cable end terminals are connected to the respective earthed electrodes at the end stations $S_1$ and $S_8$.

A potentiometer 34 is shown including a resistor 35, across which a known adjustable voltage drop may be maintained by a battery 36 and an adjustable resistor 37, through a double-pole, double-throw switch 38. The voltage drop across the resistor 35 may be measured by a voltmeter 39. An adjustable control arm 40, the position of which, along the resistor 35, may be calibrated in fractional parts of the known voltage drop thereacross, is shown connected in series with a terminal A and with either a terminal B or a terminal C of the potentiometer, through a galvanometer 41 and a single-pole, double-throw switch 42. The terminals A and C are shown connected to the earthed electrodes at the respective end terminals of the cable 32. The terminal B is shown grounded, to indicate that it will be connected to the earthed electrode at the particular station at which the measurement is being made.

The voltage drop between the terminal A and either the terminal B or the terminal C may thus be measured by adjusting the contact arm 40 until the galvanometer 41 reads zero. When this occurs, the potential difference between the terminals A and B or A and C, as the case may be, is balanced against a known voltage drop along the resistor 35, which is readily ascertained from the calibrated scale of the potentiometer. If, in the course of exploration, the direction of the potential drop along the surface-profile line should become reversed, the direction of the voltage drop across the resistor 35 should also be changed, to effect a balance. This may be achieved by closing the switch 38 in the proper direction.

In the use of the apparatus, to obtain data from which to plot the potential and the potential-differential profiles, a series of readings are taken of the potential drops between the earthed electrode at the station S₁, and the earthed electrodes at each of the stations S₂, S₃, S₄, etc. To this end, the terminal A may first be connected to the left-hand terminal 33 at the station S₂, and the switch 42 is thrown to the left, into contact with the terminal B, grounded at station S₂. The arm 40 is adjusted until the galvanometer 41 reads zero. A measurement of the voltage drop between the stations S₁ and S₂ may then be made readily by reading the calibrated scale of the potentiometer. The terminal A may next be connected to the left-hand terminal 33 at the station S₃ and terminal B grounded at this point—the terminals 33 at the station S₂ being connected together—and another measurement may similarly be made to determine the voltage drop between the stations S₁ and S₃. This operation may be repeated until measurements of the voltage drop have been made at all the stations. The potential-profile curve may be plotted from these measurements.

The data for plotting the potential-differential-profile curve may be derived from the readings thus obtained of the potential drops between the stations S₁ and S₂, S₁ and S₃, etc., merely by subtraction. As an illustration, the potential drop between the stations S₂ and S₃ is equal to the potential drop between the stations S₁ and S₃ minus the potential drop between the stations S₁ and S₂. In building the potential-differential-profile curve, the potential differences between successive stations should be plotted at the midpoints between the stations across which they are measured.

The potential data derived along a plurality of selected surface profile lines may be placed on a map, and points of equal potential connected by lines to form equipotential curves.

To show how the method of the present invention is carried into execution reference is now made to a series of surveys utilizing the principles above discussed. Fig. 16 of the drawings is a plan view of the earth's surface in the Rodessa Fault area of Louisiana showing the production limits of an underlying oil bearing formation in dotted line as actually determined by the method of the present invention; and Figs. 17 to 21 are experimentally derived potential differential profile curves based upon potential measurements taken along the respective surface profile lines A—A, B—B, C—C, D—D and E—E of Fig. 16. As noted in Fig. 16 these potential measurements were made along surface profile lines extending in a general north-to-south direction.

Each of the potential differential profile curves of Figs. 17 to 21 is characterized by a definite cutting of the zero axis at a positive slope at points 1, 3, 5, 7 and 9 and a later definite return across the axis at a negative slope at points 2, 4, 6, 8 and 10. Each of the potential differential profile curves of Figs. 17 to 21 also includes maximum and minimum points. In order to determine which group of points is critical in delimiting the underlying oil bearing formation it becomes necessary to compare the experimentally derived potential differential profile curves of Figs. 17 to 21 with the characteristic potential differential profile curves previously described and depicted in Figs. 3, 6, 8, 10, 12 and 14. The experimentally derived potential differential curves of Figs. 17 to 21, except for a reversal of sign of the $\Delta E$ values, correspond to the dotted line potential differential profile curve of Fig. 10 wherein the zero points $b'$ and $d'$ are critical in defining the limits of the underlying oil bearing formation. By comparing the experimentally derived potential differential profile curves with the corresponding characteristic curves in the manner noted, it is at once evident that the zero points 1 to 10 of the potential differential profile curves in Figs. 17 to 21 are critical in delimiting the oil bearing formation. By interconnecting corresponding points 1, 3, 5, 7 and 9 as indicated in Fig. 16 the approximate northern boundary of the underlying oil bearing formation is fixed and by interconnecting the remaining critical points 2, 4, 6, 8 and 10 the approximate southern boundary is defined.

The consistently greater slope of the potential differential profile curves in Figs. 17 to 21 at the points 2, 4, 6, 8 and 10 defining the southern boundary as compared with the slopes of the potential differential profile curves where they intersect the axis of abscissae at the points 1, 3, 5, 7 and 9 defining the nothern boundary indicates that the oil bearing formation dips to the north. The northern and southern boundaries of the oil deposit as indicated by the broken lines 1—9 and 2—10, respectively, of Fig. 16 are regarded only as approximations for lack of more surface profile lines, but the rough southern boundary line 2—10 closely follows the Rodessa Fault area from which the underlying strata are known to dip toward the north.

When the survey depicted in Fig. 16 was started the discovery well and the well designated Hunter #1 were the only wells in this area at that time but drilling was under way in the well bearing the designation Chatten #1. This latter well proved to be dry, as predicted from the survey made utilizing the method of the present invention. The black dots and the open circles represent the major portion of the producing and dry wells respectively that have been sunk about this area since the completion of the survey. The production limits determined by actual drilling are in excellent agreement with the predicted limits.

Figs. 22 and 23 are experimentally derived potential differential profile curves based upon potential measurements taken respectively along an east-west surface profile line in the Sam's Field and the Lucien Field of Oklahoma in accordance with the method of the present invention. These experimentally derived curves have maximum and minimum points as well as zero points where the curves intersect the axis of abscissae. As in the case of the Rodessa Fault area, the group of points that is critical in delimiting the underlying oil bearing formation is determined by comparing the experimentally derived curves of Figs. 22 and 23 with the characteristic potential differential profile curves of Figs. 3, 6, 8, 10, 12 and 14. It is at once evident that the experimentally derived curves of Figs. 22 and 23 correspond to the characteristic potential differential profile curve of Fig. 3 and that the maximum and minimum points are therefore critical in defining the limits of the oil bearing formation. The actual production limits of both the Sam's Field and the Lucien Field as indicated in Figs. 22 and 23 cover approximately 77% of the distance between the maximum and minimum points of the potential differential profile curve taken across each field.

Fig. 24 is a plan view of a portion of the earth's surface in the Buckner Field of Arkansas showing the production limits of an underlying oil bearing formation in solid line as actually determined by the method of the present invention; and Figs. 25 and 26 are experimentally derived potential differential profile curves based upon potential measurements taken in this field along the respective surface profile lines P—3 and P—6 of Fig. 24. The number of profile lines along which potential measurements were taken in delimiting the underlying oil bearing formation is clearly indicated in Fig. 24.

The potential differential profile curves of Figs. 25 and 26, like most of the potential differential profile curves across this area, show decided dips some of which definitely cross the axis of abscissae. These experimentally derived curves, therefore, are similar to the characteristic potential differential profile curves of Figs. 12 and 14 in which the zero points are critical in defining the limits of the underlying oil bearing formation. Thus, by noting these critical points on the experimentally derived potential differential profile curves and by interconnecting corresponding points on adjacent curves, the limits of the underlying oil bearing formation are fixed, as indicated by the solid boundary line in Fig. 24. The dips in the experimentally derived curves of Figs. 25 and 26 which fail to cross the axis of abscissae may be caused by conducting areas extending vertically through the oil bearing formation or to areas of relatively high resistivity adjacent the surface. The depressions of the experimentally derived curves that cross the zero axis represent conducting areas through the formation with associated electromotive forces, as postulated by the characteristic potential differential profile curve of Fig. 14. One such area is crossed by the surface profile line P—3 and two by the surface profile line P—6, as is apparent from an examination of Figs. 25 and 26. The complete survey discloses eight of these areas. Their form may be considered only as approximate for lack of a more detailed survey.

When the survey of Fig. 24 was made the discovery well had reached a depth of about 4,000 feet. It later came in at a depth of 7,256 feet. The black dots and circles represent wet and dry wells respectively that have been sunk since the survey was made. To the extent that this field has been developed, the experimentally determined production limits agree closely with the limits predicted by the use of the method of the present invention.

The characteristic potential differential profile curves previously discussed herein have been assumed to result from the natural earth currents directly associated with the local oil bearing formation with their source seated within or along the side boundaries of the formation. In some areas, at least, there will be other earth currents whose origins are far removed from these relatively small local oil bearing formations. The effect of such remotely originating currents respectively on the local potential and potential differential profile curves may be understood from an examination of Figs. 27 and 28. The method involving correcting for the extraneous currents is not claimed herein, however, as it constitutes the subject matter of application, Serial No. 566,937, filed Dec. 6, 1944.

Curves 1 and 2 of Fig. 27 represent respectively the potential profile curves caused by a superimposed remotely originating earth current and the local earth current associated with an oil bearing formation. The dotted line curve identified by the reference character 3 is the sum of curves 1 and 2. Curve 3 therefore is the potential profile curve resulting from both systems of earth currents.

Where a surveyed area carries both earth currents that originate in remote regions and local currents associated with an oil deposit, the beginning and end portions of any potential profile curve crossing the oil area will still define a substantially straight line termed the normal potential profile curve but it will now be inclined from the horizontal, as shown by the line 1 of Fig. 27. The slope of this normal potential profile curve 1 is determined by the component of the broad gauge earth currents directed along the surface profile line. In this case, as in the case where only local earth currents are associated with an oil bearing formation the location of the portions of the potential profile curve that definitely depart from the normal serve to locate approximately the limits of the oil bearing formation along the surface profile line.

Since the curve 2 of Fig. 27 gives the potential profile resulting from the local oil-associated earth currents alone and the ordinate of the broken line profile curve 3 is the algebraic sum of the corresponding ordinates of the curves 1 and 2, it follows that a potential profile as experimentally derived from field measurements partakes of the character of the broken line curve 3 in that its ordinates are the combined effect of the local and extraneous earth currents traversing the area that is being surveyed. Wherefore, it follows that the potential profile curve 2 (Fig. 27) due to the local oil-associated currents alone, which is desired, can be constructed by making its ordinates equal to the algebraic difference of the correspondence ordinates of the experimentally developed potential profile curve 3 and the normal potential profile curve 1.

Fig. 30 is constructed from such corrected potential profiles plotted from field measurements. The procedure is to draw the normal potential profile through the origin of each experimentally derived potential profile with its slope determined by the potential difference between two or more points on the profile path, that are substantially clear of the influence of the local currents. The preferred distribution of these points is such that one or more shall lie outside of each border of the formation. Since the form of the corrected profiles is dependent only on the local oil-associated earth currents they can each be made consonant with some reference point a by shifting them vertically until they are all in agreement at their points of intersection.

Fig. 28 shows the nature and magnitude of the distortion of the potential differential profile caused by the extraneous earth currents giving rise to the linear profile 1 of Fig. 27. Broken line curve 2 is the potential differential of the experimentally determined profile 3 and the solid line curve 1 is the differential of its corrected form which is shown by the solid line curve 2 of Fig. 27. It will be seen that the curve 2 of Fig. 28 is not a distortion of the desired potential differential profile 1 but simply a vertical displacement of this curve and that this displacement is numerically equal to the slope of the normal potential curve 1 of Fig. 27. It follows that an experimentally determined potential differential profile can be corrected for the effects of extraneous earth currents by properly shifting it along the direction of ordinates by an amount equal to the slope of the normal potential profile.

It very often happens that the extraneous earth currents will vary during the measurements. I have discovered that any such variation may be conside ibly reduced by directing the surface-profile line normal to the average direction of the extraneous earth currents. Under these conditions, the potential drop due to such currents may remain fairly constant, and of relatively small magnitude.

If the potential along the surface-profile line, such as between the stations $S_1$ and $S_8$ (Fig. 31), due to these extraneous earth currents, does, however, vary appreciably during the successive readings of potential difference at the various stations, such variations may be compensated for when plotting the potential-profile, potential-differential-profile and the equipotential-profile curves.

Let it be assumed, for example, that a reading is taken between the stations $S_1$ and $S_2$, with the switch 42 connected to the terminal B. Let it further be assumed that, at the time that this reading is taken, a further reading is obtained between the stations $S_1$ and $S_8$, with the switch 42 connected to the terminal C, and that this last-named reading is 20 millivolts. This 20 millivolt figure may then be adopted as a reference normal potential. Let it be also assumed that, when the potentiometer is moved to the next station $S_3$, the potential difference between the stations $S_1$ and $S_8$, due to the extraneous earth currents, has risen to 25 millivolts. In order to compensate for this change of 5 millivolts across the whole profile, the fractional part of this change, represented by the ratio of the distance $S_1$ to $S_3$ to the distance $S_1$ to $S_8$, or 2/7, should be subtracted from the measured potential difference between the stations $S_1$ and $S_3$ to bring the reading of this potential difference into conformity with the assumed 20-millivolt reference normal-potential profile.

The readings of the potential differences between the stations $S_1$ and $S_3$, $S_1$ and $S_4$, etc., may similarly be adjusted, in this manner, for any further changes in potential due to extraneous earth currents between the stations $S_1$ and $S_8$ that may have taken place during the taking of the readings at the various stations.

The conception and use of the normal potential profile for eliminating the distortion that may be imposed on the potential and potential differential profiles forms a part of the present invention, as does a quite different procedure that may be understood in connection with Fig. 29 which shows a potential profile 1 and three associated potential differential profiles 2, 3 and 4. These differential profiles employ a progressively increased spacing between the electrodes but increment $\Delta S$ by which the electrodes are progressed along the profile path between successive potential measurements remains constant and is equal to one division along the profile line S—S. The electrode spacing for curve 2 is one space interval along the path S—S, that of curve 3 is three spaces and that of curve 4 is five spaces. The ratio of $\Delta E/\Delta S$ for each measured $\Delta E$ is plotted on the ordinate line that bisects the space along S—S across which the $\Delta E$ is measured.

A consideration of curves 2, 3 and 4 of Fig. 29 shows that the slope of a potential differential profile at the zero intercepts becomes steeper as the ratio between potential space increment and path increment becomes greater; that the maximum and minimum points are shifted horizontally from their true positions and that the zero intercepts are shifted relatively little from their true positions. It also shows that a vertical displacement of these curves, such as produced by extraneous earth currents, will shift the zero intercepts less as their slope at these intercepts becomes greater. Obviously this type of potential differential profile is effective only in cases where the zero intercepts are the critical points.

As already noted, the zero points are shifted relatively little along the axis of abscissae as the distance over which the potential measurement is taken is increased. Such horizontal displacement as the zero intercept points show is due to the lack of symmetry of the potential curve 1 about a vertical line through its maximum point $a$. If real symmetry existed, there would be no shift of the zero points. The broken line $a$—$h$ is determined by the center point of the different distances over which the potential measurements are taken when fitted horizontally into the maximum portion of curve 1. The deviation of this broken line $a$—$h$ from the vertical measures the shift of the intersection of the potential differential profile curve with the axis of abscissae caused by the distance over which the potential measurement is taken.

It follows that increasing the distance over which the potential measurement is taken tends to minimize the displacement of the zero points of the potential differential profile curves caused by a superimposed earth current or by experimental errors because it tends to increase the slope of the potential differential profile curve where it intersects the axis of abscissae. At the same time, increasing the distance over which the potential measurement is taken tends to displace the zero points of the potential differential profile curve by reason of lack of symmetry of the potential profile about its maximum and minimum points, as indicated in Fig. 29.

Field experience has shown that in most locations the optimum value of the distance over which the potential measurement is taken lies between 1,000 and 6,000 feet; and the increment or space interval between successive potential measurements by which the electrodes so spaced are shifted along the surface profile line usually lies between 200 and 1,200 feet. The resulting potential differential profile curve admittedly is less sensitive than and somewhat distorted from the true mathematical differential of the potential profile curve. These approximate potential differential profile curves, however, retain sufficient sensitivity in those cases where the zero points are critical in delimiting the oil bearing formation and at the same time are insensitive to the small local irregularities, extraneous earth currents and experimental errors which may be misleading.

Thus far the description of my method and procedure of searching an area for oil bearing formations has been largely confined to the development and use of potential differential profiles taken across the area. It has been shown that a proper interpretation of such profiles serves to show the presence, limits, slope and approximate depth of such formations through my discovery that vertically directed current sheets are established along the side boundary of the formation or a portion thereof. It remains to explain how this same information can also be gained from a plot of the equipotential lines on the overlying and adjacent portions of the earth's surface. Fig. 30 reproduces a portion of such a plot taken across an area in Oklahoma.

Electromagnetic theory predicts first, that a vertically directed earth current will give rise to closed equipotential lines on the overlying earth's surface and that, conversely, the presence of closed equipotential lines predicates the presence of a vertically directed current; and second, that the line of maximum or minimum potential will define the axis of the current stream. Thus, from the foregoing, it will be understood that the presence of closed equipotential lines in Fig. 30 proves the presence of vertically directed currents and that, in accordance with my discovery that vertical current sheets are associated with the side boundaries of oil bearing formations, the dashed line of minimum potential identified by M represents the side limits of the production area because it depicts the axis of the vertical current sheet. This will become clear from a consideration of Figs. 7 and 8 which show that the potential profile curve across a rising current sheet passes through a maximum as the curve crosses the point where the current sheet divides; and that, conversely, a descending current sheet causes the potential profile curve to pass through a minimum at the point where the divided current sheet unites. Thus, the locus of the maximum or minimum potential points will give the line axis of the current sheets and hence the boundary of the underlying oil formation. The contour M (Fig. 30) as already noted represents the locus of such minimum potential points. The slope of the formation is along the line S—S and the greater crowding of the lines at the b' border shows that this edge of the formation lies nearer the surface than does the d' edge. Thus the formation dips from b' to d'. Finally it can be proved that, other things being equal, the density of the equipotential lines adjacent to the current axis is roughly proportional to the inverse cube of the depth of the formation. Having determined an approximate value of the proportionality factor from field observations the approximate depth can be determined in terms of the density of the equipotential lines adjacent to the current axis at either or both limits as represented by b' and d'.

While the presence and limits of oil deposits can be determined by taking either potential or potential differential profiles across an area it is preferred to take both in order that each may be used as a check against the other. As an example of the value of such checks, suppose we have a potential differential profile along the line S—S of Fig. 30 and find some difficulty in deciding which of the intercepts along the profile line lie on the axis of the bordering current sheet. This can be definitely decided by a consideration of the equipotential plot which shows the very approximate position of the current sheet axis along the profile. Also it will be noted that the direction of slope of an oil bearing formation cannot be determined from a single profile but requires the slope along two profiles directed at right angles in order to determine the slope and its direction. The equipotential plot, however, shows the general slope at a glance and in fact gives a better overall picture of the underlying oil bearing formation than can be obtained from potential differential profiles. Such profiles, however, can serve to define the production limits, slope and depth of the formation with greater exactitude than can a plot alone of the equipotential contours. Thus the desirability of taking data for both potential and potential gradient profiles and of plotting these and also the equipotential contours becomes apparent.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A method of determining the presence or the physical characteristics, such as the probable boundaries, the depth and the inclination, of an oil-bearing formation that comprises measuring at points along a profile line differences of electrical potential caused at least in part by the natural currents of the oil-bearing formation, plotting a curve the ordinates of which depend upon the said differences of potential and the abscissae of which depend upon the positions of the said points and, if the said curve is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said curve of the said type that is known to indicate the presence or the physical characteristics, such as the boundaries, the depth and the inclination, of the known type of oil-bearing formation, the probable presence or characteristics of the first-named oil-bearing formation.

2. A method of determining the presence or the physical characteristics, such as the probable boundaries, the depth and the inclination, of an oil-bearing formation that comprises measuring at points along a profile line differences of electrical potential caused at least in part by the natural currents of the oil-bearing formation, determining a relation between the said differences of potential and the positions of the said points and, if the said relation is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said relation of the said type that is known to indicate the presence or the physical characteristics, such as the boundaries, the depth and the inclination, of the known type of oil-bearing formation, the probable presence or characteristics of the first-named oil-bearing formation.

3. A method of determining the presence or the physical characteristics, such as the probable boundaries, the depth and the inclination, of an oil-bearing formation that comprises measuring at points along a profile line differences of electrical potential caused at least in part by the natural currents of the oil-bearing formation, plotting a potential-profile curve having the said differences of potential as ordinates and the distances between said points as abscissae and, if the said curve is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said curve of the said type that is known to indicate the presence or the physical characteristics, such as the boundaries, the depth and the inclination, of the known type of oil-bearing formation, the probable presence or characteristics of the first-named oil-bearing formation.

4. A method of determining the presence or the physical characteristics, such as the probable boundaries, the depth and the inclination, of an oil-bearing formation that comprises measuring at points along a profile line differences of electrical potential caused at least in part by the natural currents of the oil-bearing formation, plotting a potential-differential profile curve having the differences between the said differences of potential as ordinates and the distances between said points as abscissae and, if the said curve is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said curve of the said type that is known to indicate the presence or the physical characteristics, such as the boundaries, the depth and the inclination, of the known type of oil-bearing formation, the probable presence or characteristics of the first-named oil-bearing formation.

5. A method of determining the presence or the physical characteristics, such as the probable boundaries, the depth and the inclination, of an oil-bearing formation that comprises measuring at points on the earth differences of electrical potential caused at least in part by the natural currents of the oil-bearing formation, plotting equipotential curves based on the said measurements and, if the plot of the said equipotential curves is of the type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said plot of the said equipotential curves of the said type that is known to indicate the presence or the physical characteristics, such as the boundaries, the depth and the inclination, of the known type of oil-bearing formation, the probable presence or characteristics of the first-named oil-bearing formation.

6. A method of determining the presence or the physical characteristics, such as the probable boundaries, the depth and the inclination, of an oil-bearing formation that comprises measuring at points along a plurality of profile lines differences of electrical potential caused at least in part by the natural currents of the oil-bearing formation, plotting a corresponding plurality of curves the ordinates of which depend upon the said differences of potential and the abscissae of which depend upon the positions of the said points and, if the said curves are of a type that have a critical feature or features known to represent earth potentials resulting from current streams arising from the peripheries of a known type of oil-bearing formation and known to indicate the presence or the physical characteristics, such as the bounaries, the depth and the inclination, of the known type of oil-bearing formation, determining, by analogy with the critical feature or features of the said curves of the said type that are known to indicate the presence or the physical characteristics, such as the boundaries, the depth and the inclination, of the known type of oil-bearing formation, the probable presence or characteristics of the first-named oil-bearing formation.

7. A method of determining the probable inclination of an oil-bearing formation that comprises measuring at points along a profile line differences of electrical potential caused at least in part by the natural currents of the oil-bearing formation, plotting a potential-differential-profile curve having the differences between the said differences of potential as ordinates and the distances between said points as abscissae and, if the said curve is of a type that has critical maximum and minimum points known to represent earth potentials resulting from current streams arising from the peripheries of a known type of oil-bearing formation and the relative magnitudes of which are known to indicate the inclination of the known type of oil-bearing formation, determining, by analogy with the relative magnitudes of the critical maximum and minimum points of the said curve of the said type that is known to indicate the inclination of the known type of oil-bearing formation, the probable inclination of the first-named oil-bearing formation.

8. A method of determining the probable depth of an oil-bearing formation that comprises measuring at points along a profile line differences of electrical potential caused at least in part by the natural currents of the oil-bearing formation, plotting a potential-differential-profile curve having the differences between the said differences of potential as ordinates and the distances between said points as abscissae and, if the said curve is of a type that has a critical maximum or minimum point known to represent earth potentials resulting from current streams arising from the peripheries of a known type of oil-bearing formation and the magnitude of which is known to indicate the depth of the known type of oil-bearing formation, determining, by analogy with the magnitude of the critical maximum or minimum point of the said curve of the said type that is known to indicate the depth of the known type of oil-bearing formation, the probable depth of the first-named oil-bearing formation.

9. A method of determining the probable inclination of an oil-bearing formation that comprises measuring at points along a profile line differences of electrical potential caused at least in part by the natural currents of the oil-bearing formation, plotting a potential-differential-profile curve having the differences between the said differences of potential as ordinates and the distances between said points as abscissae and, if the said curve is of a type that has critical zero points, where it crosses the axis of abscissae, known to represent earth potentials resulting from current streams arising from the peripheries of a known type of oil-bearing formation and the relative magnitudes of the slopes of which, where the plotted curve has relatively large slopes at critical zero points, are known to indicate the inclination of the known type of oil-bearing formation, determining, by analogy with the relative magnitudes of the relatively large slopes of the said curve of the said type that is known to indicate the inclination of the known type of oil-bearing formation, at the critical zero points where it crosses the axis of abscissae, the probable inclination of the first-named oil-bearing formation.

10. A method of determining the probable depth of an oil-bearing formation that comprises measuring at points along a profile line differences of electrical potential caused at least in part by the natural currents of the oil-bearing formation, plotting a potential-differential-profile curve having the differences between the said differences of potential as ordinates and the distances between said points as abscissae, and, if the said curve is of a type that has a critical zero point or points, where it crosses the axis of abscissae, known to represent earth potentials resulting from current streams arising from the peripheries of a known type of oil-bearing formation and the magnitude of the slope of which, where the plotted curve has a relatively large slope at one of the critical zero points, is known to indicate the depth of the known type of oil-bearing formation, determining, by analogy with the magnitude of the relatively large slope of the said curve of the said type that is known to indicate the depth of the known type of oil-bearing formation, at the critical zero point where it crosses the axis of abscissae, the probable depth of the first-named oil-bearing formation.

HARVEY C. HAYES.